A. KISSOCK.
PROCESS FOR SEPARATING LEAD AND MOLYBDENUM FROM MINERAL WULFENITE.
APPLICATION FILED DEC. 14, 1915.
1,218,412.
Patented Mar. 6, 1917.
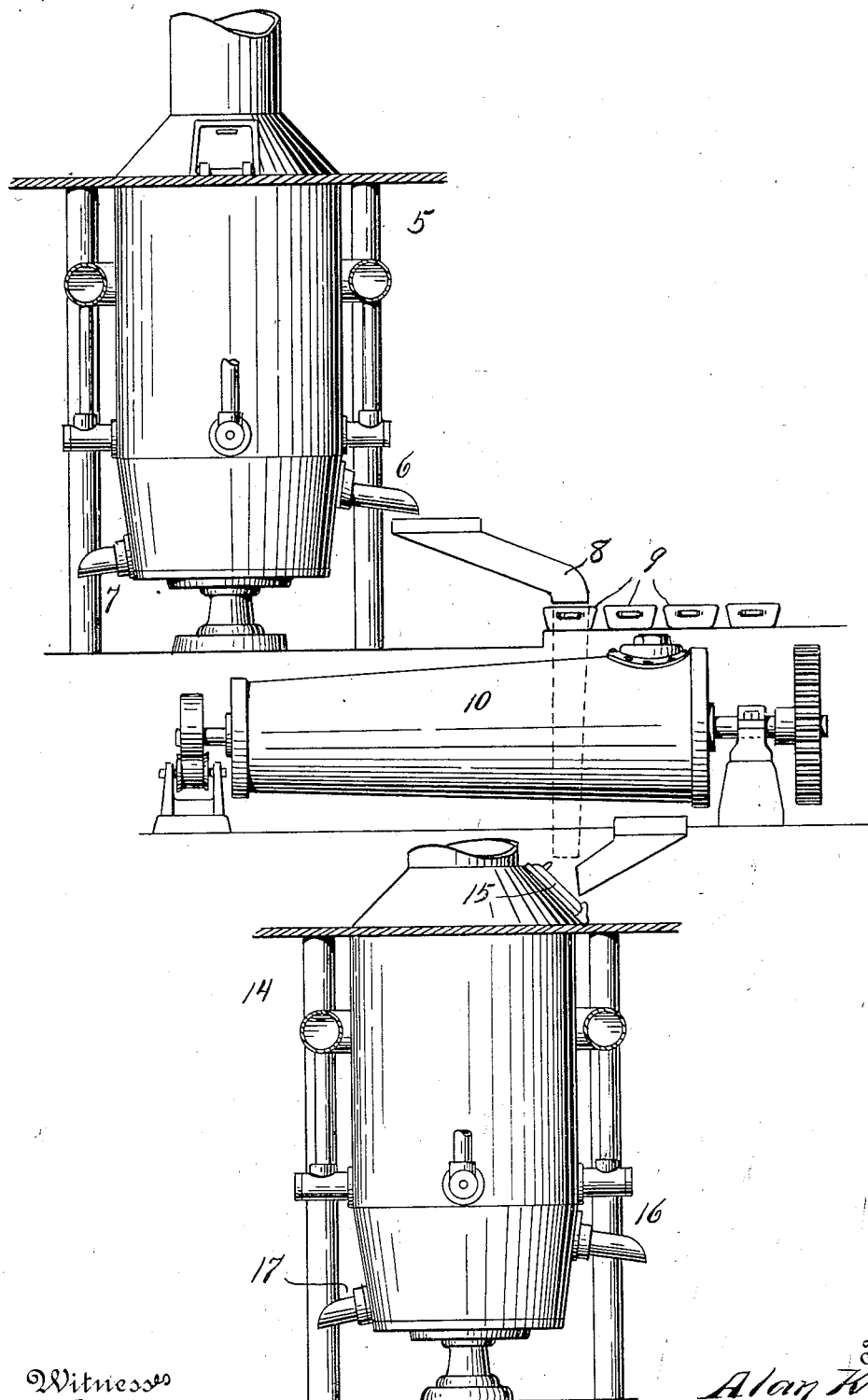

UNITED STATES PATENT OFFICE.

ALAN KISSOCK, OF TUCSON, ARIZONA.

PROCESS FOR SEPARATING LEAD AND MOLYBDENUM FROM MINERAL WULFENITE.

1,218,412. Specification of Letters Patent. Patented Mar. 6, 1917.

Application filed December 14, 1915. Serial No. 66,723.

*To all whom it may concern:*

Be it known that I, ALAN KISSOCK, a citizen of the United States, residing at Tucson, county of Pima, and State of Arizona, have invented certain new and useful Improvements in Processes for Separating Lead and Molybdenum from Mineral Wulfenite; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a process for treating the mineral wulfenite, chemically known as lead molybdate, and my object is to separate lead and molybdenum in marketable form from the said wulfenite.

My process may be briefly summarized as follows: The mineral wulfenite, or concentrates containing this mineral, or lead molybdate ore is well mixed with carbon and any suitable flux, and is then introduced into a furnace and subjected to heat until quiet fusion takes place, when the carbon will reduce all of the contained lead to the metallic state and the flux will cause all of the contained molybdenum to pass into the slag as any desired molybdate. The slag and metallic lead are separately withdrawn from the furnace and the said metallic lead and the molybdenum contained in the slag are both then in marketable form. However, the slag containing the molybdenum may be subjected to further treatment if desired, either by running this molten slag and a mixture of desired flux and carbon direct into a second furnace, or by cooling and crushing it to a suitable fineness and then mixing it with any suitable flux and carbon, and introducing this charge into a second furnace where it is subjected to a sufficient heat to produce a second fusion. During this second fusion the carbon will reduce all of the contained molybdenum to the metallic state while the flux will unite with the basic element of the contained molybdate forming a slag more or less free from molybdenum. This resulting metallic molybdenum is withdrawn from the furnace separately from the slag, cast into bars, and is then ready for market. The slag may be disposed of in any convenient manner.

My process may be varied to the extent that iron may be added to the charge either at the time of first or second fusion, or any iron contained in the ore may be reduced, whereby the ultimate product will be ferromolybdenum instead of pure molybdenum. Otherwise, the process is carried out as in the manner above set forth.

Having briefly outlined my improved construction, I will proceed to describe the same in detail, reference being made to the accompanying drawing, in which is illustrated an embodiment thereof.

In the construction disclosed upon the drawing, let the numeral 5 designate a suitable furnace, preferably basic or neutrally lined, said furnace having upper and lower outlets provided with spouts 6 and 7 respectively. Directly beneath the upper spout is located the upper extremity of a chute 8, its lower extremity terminating above an iron mold 9, in which the slag is allowed to cool. The cooled slag is fed into a crusher 10, from which it is taken and mixed with carbon and suitable flux and fed into a second furnace 14, through an opening in the top of the latter normally closed by a door 15. Or, the lower extremity of the chute 8, may be made to terminate directly above the opening in the second furnace 14, running the molten slag from furnace 5 directly into furnace 14, as may be desired. This second furnace 14 may or may not be of same type as the furnace 5, and is also provided with upper and lower outlets which are respectively connected with spouts 16 and 17.

In carrying out my process I employ the above described construction, as follows: The wulfenite or lead molybdate ore is first mixed with carbon and a suitable flux (for example, soda ash), the amount of carbon used being only sufficient to reduce all of the contained lead to the metallic state, while a sufficient quantity of flux is employed to convert all of the molybdenum contained in the ore into any desired molybdate, the latter forming the slag, together with any valuable impurities such as vanadium, iron, tungsten, etc., which may be in the said ore. If the flux employed is soda ash the molybdenum will be in the slag in the form of sodium molybdate. A typical furnace charge of the above mixture will be as follows:

100 lbs. ore.
  60— 80 lbs, soda ash.
   2 lbs. of carbon.

Attention is called to the fact that in such a charge sufficient soda ash is contained to take care of any impurities present in the ore such as vanadium, tungsten, iron, etc., as above mentioned.

This charge is then introduced into the furnace 5 through an opening therein normally closed by the door 4, and subjected to a suitable temperature, or until quiet fusion has been obtained. This will result in the metallic lead settling, because of its weight, at the bottom of the said furnace, while the slag containing the molybdenum and any other metals, with the exception of the gold, silver and copper, which may be found in the ore, is suspended above the lead. Any gold, silver or copper that may be contained in the ore will be found in the metallic lead resulting from this operation.

The slag is then withdrawn from the furnace through the upper outlet spout 6, whereby a separation is accomplished between two valuable products, namely, metallic lead and a slag containing the molybdenum in one desired form, the said slag also containing any of the impurities such as vanadium, tungsten, iron, silica, etc., that may have been in the ore. After the slag is taken off the lead may then be withdrawn through the lower outlet spout 7 and cast into bars, it then being in marketable form. Also the slag resulting from this first step contains the molybdenum in a marketable form, and it may thus be disposed of if desired, or subjected to further treatment as follows: The slag which has been withdrawn from the furnace 5 may then be discharged into the upper extremity of the chute 8, which in turn discharges said slag at its lower extremity into the iron mold 9. When this slag is cooled it is fed into the crusher 10 and crushed to a suitable fineness from which it is mixed in proper proportions with carbon and any suitable flux and fed into the second furnace 14 through an opening therein normally closed by the door 15. Or, the slag from the furnace 5 may be run directly by means of the chute 8, while still molten, into the furnace 14 through an opening therein normally closed by the door 15. The carbon and any suitable flux is separately, but at the same time as the slag, introduced into said furnace, the flux in this case being, for example, silica. This charge is heated until quiet fusion takes place and the flux by uniting with the basic element of the contained molybdate will liberate the molybdenum from the molybdate in the slag as molybdenum-trioxid, from which form it is reduced to metallic molybdenum by the carbon contained in the charge. For example, if the slag is sodium molybdate, which would result from soda ash being employed in the charge introduced into the first furnace 5, the silica will unite with the sodium, or basic element of the sodium molybdate, and will form sodium silicate, thus liberating the molybdenum as molybdenum-trioxid, which is reduced to metallic molybdenum by the carbon in the charge, as before mentioned. The slag is then withdrawn from the furnace 14 through the upper spout 16 and disposed of in any convenient manner, after which the metallic molybdenum is withdrawn through the spout 17, and cast into bars, and is then ready for the market.

Attention is particularly called to the fact that this process may be varied to the extent that iron may be added either at the time of the first fusion or at that of the second fusion, the said iron being used in any desired form, and may even be contained in the ore under treatment. In case iron is added as just disclosed, or if the iron contained in the ore itself is reduced, the ultimate product will be ferro-molybdenum instead of pure molybdenum.

Having thus described my invention, what I claim is:—

1. The herein described process of separating lead and molybdenum from lead molybdate, consisting of mixing the latter with carbon and a suitable flux, subjecting said charge to sufficient heat to cause quiet fusion, whereby metallic lead and a slag containing molybdenum are produced, grinding the said slag to a suitable fineness, mixing the ground slag with carbon and a flux, and subjecting the charge to sufficient heat to again produce quiet fusion.

2. The herein described process of separating lead and molybdenum from lead molybdate, consisting in mixing the lead molybdate with carbon and a suitable flux, introducing said charge into a furnace, subjecting it to sufficient heat therein to cause quiet fusion, whereby metallic lead and a slag containing molybdenum are produced, withdrawing the said slag and metallic lead separately from the furnace, introducing the slag into a crusher where it is ground to a suitable fineness, withdrawing the slag therefrom and mixing it with carbon and a suitable flux, introducing the charge into a second furnace and subjecting it therein to sufficient heat to produce quiet fusion whereby metallic molybdenum and a slag are produced, and withdrawing the metallic molybdenum from the furnace separately from the slag.

3. The herein described process of separating lead and molybdenum from lead molybdate, consisting in mixing the lead molybdate with carbon and soda ash, introducing the charge into a furnace, subjecting it to sufficient heat therein to cause quiet fusion whereby metallic lead and a slag containing sodium molybdate are produced, withdrawing the said slag and metallic lead separately from the furnace, introducing the slag into a crusher where it is ground to a suitable fineness, withdrawing the slag therefrom and mixing it with carbon and silica, introducing the charge into a second furnace and subjecting it therein to sufficient heat to produce quiet fusion whereby metallic molybdenum and a slag are produced, and withdrawing the metallic molybdenum from the furnace separately from the slag.

4. The herein described process of separating lead and molybdenum from lead molybdate, consisting in mixing the lead molybdate with carbon and a suitable flux, subjecting said charge to sufficient heat to cause quiet fusion whereby metallic lead and a slag containing molybdenum are produced, cooling and grinding the said slag to a suitable fineness, mixing the ground slag with carbon and another flux, and subjecting this charge to sufficient heat to again produce quiet fusion whereby metallic molybdenum and a slag are produced.

5. The herein described process of separating lead and molybdenum from lead molybdate, consisting in mixing the latter with carbon and a suitable flux, subjecting said charge to sufficient heat to cause quiet fusion whereby metallic lead and a slag containing molybdenum are produced, grinding the said slag to a suitable fineness, mixing the ground slag with carbon, a flux, and iron, and subjecting the charge to sufficient heat to again produce quiet fusion.

6. The herein described process of separating lead and molybdenum from lead molybdate, consisting in mixing lead molybdate with carbon and a suitable flux, introducing said charge into a furnace, subjecting it to sufficient heat therein to cause quiet fusion whereby metallic lead and a slag containing molybdenum are produced, withdrawing the slag from the furnace separately from the metallic lead, mixing the slag with carbon and a suitable flux, introducing this charge into a second furnace, and subjecting it therein to sufficient heat to cause quiet fusion.

7. The herein described process of separating lead and molybdenum from lead molybdate, consisting in mixing lead molybdate with carbon and a suitable flux, introducing said charge into a furnace, subjecting it to sufficient heat therein to cause quiet fusion, whereby metallic lead and a slag containing molybdenum are produced, withdrawing the slag from the furnace separately from the metallic lead, mixing the slag with carbon, a flux and iron, and subjecting the charge to sufficient heat to again produce quiet fusion, whereby ferromolybdenum is produced.

In testimony whereof I affix my signature in presence of two witnesses.

ALAN KISSOCK.

Witnesses:
M. GARVEY,
MANUEL LOPEZ.